(12) United States Patent
Ogata et al.

(10) Patent No.: US 12,343,686 B2
(45) Date of Patent: Jul. 1, 2025

(54) DETECTION SYSTEM

(71) Applicant: I-PEX Inc., Kyoto (JP)

(72) Inventors: Kenji Ogata, Fukuoka (JP); Kenji Yamaoka, Fukuoka (JP)

(73) Assignee: I-PEX Inc., Kyoto (JP)

( * ) Notice: Subject to any disclaimer, the term of this patent is extended or adjusted under 35 U.S.C. 154(b) by 983 days.

(21) Appl. No.: 17/419,796

(22) PCT Filed: Dec. 17, 2019

(86) PCT No.: PCT/JP2019/049445
§ 371 (c)(1),
(2) Date: Jun. 30, 2021

(87) PCT Pub. No.: WO2020/149075
PCT Pub. Date: Jul. 23, 2020

(65) Prior Publication Data
US 2022/0072481 A1    Mar. 10, 2022

(30) Foreign Application Priority Data
Jan. 15, 2019    (JP) .................. 2019-004005

(51) Int. Cl.
*B01D 69/02*    (2006.01)
*G01N 5/02*    (2006.01)
*G01N 27/12*    (2006.01)

(52) U.S. Cl.
CPC ............. *B01D 69/02* (2013.01); *G01N 5/02* (2013.01); *G01N 27/12* (2013.01)

(58) Field of Classification Search
CPC .......... G01N 2035/00099; G01N 2035/00752; G01N 2035/00772; G01N 2035/00881;
(Continued)

(56) References Cited

U.S. PATENT DOCUMENTS

| 4,847,783 A | 7/1989 | Grace et al. |
| 8,029,741 B2 | 10/2011 | Wakamatsu |

(Continued)

FOREIGN PATENT DOCUMENTS

| EM | 3605057 A1 | 2/2020 |
| EP | 1967837 A1 | 9/2008 |

(Continued)

OTHER PUBLICATIONS

European Search Report and Search Opinion for International Patent Application No. PCT/JP2019/049445 dated Jan. 20, 2022; 9 pages.

(Continued)

*Primary Examiner* — Gurpreet Kaur
(74) *Attorney, Agent, or Firm* — Howard & Howard Attorneys PLLC

(57) ABSTRACT

Each of detection instruments (3a, 3b, 3c, 3d . . . ) of which the number is enabled to be increased or decreased includes at least one sensitive membrane sensitive to a substance, generates first data representing the result of detection of the substance corresponding to the sensitive membrane, and includes second data in which the result of the detection of the substance corresponding to the sensitive membrane is associated with the membrane information of the sensitive membrane. An information terminal (2) collects the first data and the second data from each of the detection instruments (3a, 3b, 3c, 3d . . . ), and compares the first data and the second data, to specify an object to be detected.

4 Claims, 14 Drawing Sheets

(58) Field of Classification Search
CPC ... G01N 2291/0215; G01N 2291/0224; G01N 2291/0256; G01N 2291/0257; G01N 27/12; G01N 29/022; G01N 29/036; G01N 29/222; G01N 29/2437; G01N 35/00029; G01N 35/00871
See application file for complete search history.

(56) References Cited

U.S. PATENT DOCUMENTS

| | | |
|---|---|---|
| 2002/0178789 A1 | 12/2002 | Sunshine et al. |
| 2010/0061893 A1 | 3/2010 | Wakamatsu |
| 2017/0199159 A1 | 7/2017 | Kuroki et al. |
| 2018/0195942 A1 | 7/2018 | Wakamatsu et al. |
| 2019/0033283 A1 | 1/2019 | Yamasaki |
| 2021/0278377 A1 | 9/2021 | Ogata et al. |

FOREIGN PATENT DOCUMENTS

| | | |
|---|---|---|
| JP | 2004-108857 A | 4/2004 |
| JP | 2010-25728 A | 2/2010 |
| JP | 2018-173313 A | 11/2018 |
| WO | WO 2007-077963 A1 | 7/2007 |
| WO | WO 2017-130774 A1 | 8/2017 |

OTHER PUBLICATIONS

International Search Report for International Patent Application No. PCT/JP2019/049445 dated Feb. 18, 2020; 2 pages.
Written Opinion for International Patent Application No. PCT/JP2019/049445 dated Feb. 18, 2020; 4 pages.
English language abstract and machine-assisted English language translation for Japanese Patent Publication No. 2004-4108857 A extracted from www.espacenet.com database on Jun. 29, 2021; 7 pages.
English language abstract and machine-assisted English language translation for Japanese Patent Publication No. JP 2010-025728 A extracted from www.espacenet.com database on Jun. 29, 2021; 45 pages.

FIG. 11

| 3a | | REACTION LEVEL | | 3a | M | M | REACTION LEVEL |
|---|---|---|---|---|---|---|---|
| 1 | a | 100 | 1 | a | M1 | M1 | 100 |
| | b | 120 | | b | M2 | M2 | 120 |
| | c | 50 | | c | M3 | M3 | 50 |
| | d | 60 | | d | M4 | M4 | 60 |
| | e | 200 | | e | M5 | M5 | 200 |
| | f | 100 | | f | M6 | M6 | 100 |
| 2 | a | 110 | 2 | a | M1 | M1 | 110 |
| | b | 210 | | b | M5 | M5 | 210 |
| | c | 90 | | c | M6 | M6 | 90 |
| | d | 80 | | d | M19 | M19 | 80 |
| | e | 100 | | e | M20 | M20 | 100 |
| | f | 120 | | f | M21 | M21 | 120 |

15(5b)  16(5b)  17

DETECTION SYSTEM

CROSS-REFERENCE TO RELATED APPLICATIONS

This application is the National Stage of International Patent Application No. PCT/JP2019/049445, filed Dec. 17, 2019, which claims priority to and all the advantages of Japanese Patent Application No. JP 2019-004005, filed Jan. 15, 2019, the entire contents of which are hereby incorporated by reference.

TECHNICAL FIELD

The present disclosure relates to a detection system.

BACKGROUND ART

Patent Literature 1 discloses a substance detecting element that is attached to an electronic instrument for drive control, and detects an adsorbed substance on the basis of a variation in the resonance frequency of a vibrator with a substance adsorption film adsorbing the substance. The substance detecting element, which is attached to the electronic instrument that drives the vibrator with a substance adsorption film and detects a variation in the resonance frequency of the vibrator, is used.

Further, Patent Literature 1 discloses that various chemical substances can be detected by preparing a plurality of substance detecting elements capable of detecting substances of which combinations are different from each other, and by exchanging such a substance detecting element attached to an electronic instrument.

CITATION LIST

Patent Literature

Patent Literature 1: Unexamined Japanese Patent Application Publication No. 2018-173313

SUMMARY OF INVENTION

Technical Problem

In the technology disclosed in Patent Literature 1 above, it is necessary to exchange a substance detecting element attached to the electronic instrument for another substance detecting element in the case of changing a combination of substances to be detected. Moreover, it is difficult to determine a substance, to which a sensitive membrane is sensitive, by the appearance of the substance. Therefore, it is necessary to take control of the kind of a substance that can be detected by a sensitive membrane in each substance detecting element in the case of detecting various chemical substances. However, the increased number of sensitive membranes and the increased number of the kinds of the sensitive membranes cause such control to become an operation that is more laborious for a user.

The present disclosure was made under such actual circumstances with an objective to provide a detection system that eliminates a user having to perform an operation of taking control of a sensitive membrane and enables an increase in the number of collectively detected substances.

Solution to Problem

In order to achieve the aforementioned objective, a detection system according to the present disclosure includes:

a detection instrument which includes at least one sensitive membrane sensitive to a substance, generates first data representing a result of detection of the substance corresponding to the sensitive membrane, and includes second data in which the result of the detection of the substance corresponding to the sensitive membrane is associated with membrane information of the sensitive membrane, and of which the number is enabled to be increased or decreased; and a substance detector that collects the first data and the second data from the detection instrument, and compares the first data and the second data, to specify a substance.

In such a case, it is also acceptable that the detection instrument includes:

an adaptor that includes at least one detection substrate on which the sensitive membrane is disposed, outputs a detection signal for the substance corresponding to the sensitive membrane, output from the detection substrate, and includes the second data; and a detection instrument body to which the adaptor is exchangeably attached, and which generates the first data based on the detection signal for the substance corresponding to the sensitive membrane, output from the attached adaptor, and transmits the first data to the substance detector through a communication network.

Moreover, it is also acceptable that the detection substrate of the adaptor includes a memory for storing the second data, the detection instrument body reads the second data from the attached memory of the detection substrate, and the substance detector collects, through the communication network, the second data read by the detection instrument body included in the detection instrument.

Moreover, it is also acceptable that an identification code representing the second data is displayed on the adaptor, the detection system includes an imaging device that images the identification code displayed on the detection substrate of the detection instrument, and the substance detector collects the second data based on the identification code imaged by the imaging device.

Further, it is also acceptable that the substance detector includes a database in which an object to be detected and a range of a reaction level of the sensitive membrane in the object to be detected are associated with each other and registered, and detects the object to be detected by referring to the database using, as a key, reaction level data representing the reaction level of the sensitive membrane, generated by comparing the first data and the second data

Advantageous Effects of Invention

In accordance with the present disclosure, a substance detector compares first data representing the result of detection of a substance corresponding to a sensitive membrane included in a detection instrument, and second data in which the result of the detection of the substance corresponding to the sensitive membrane included in the detection instrument is associated with the membrane information of the sensitive membrane, to specify the substance. As a result, the result of the detection in the sensitive membrane and the membrane information of the sensitive membrane can be automatically linked to each other. As a result, a user is eliminated having to perform an operation of taking control of the sensitive membrane, and the number of collectively detected substances can be increased.

BRIEF DESCRIPTION OF DRAWINGS

FIG. 11 is a schematic view illustrating a situation in which the first data and the second data are compared to generate reaction level data;

DESCRIPTION OF EMBODIMENTS

Figure 1:
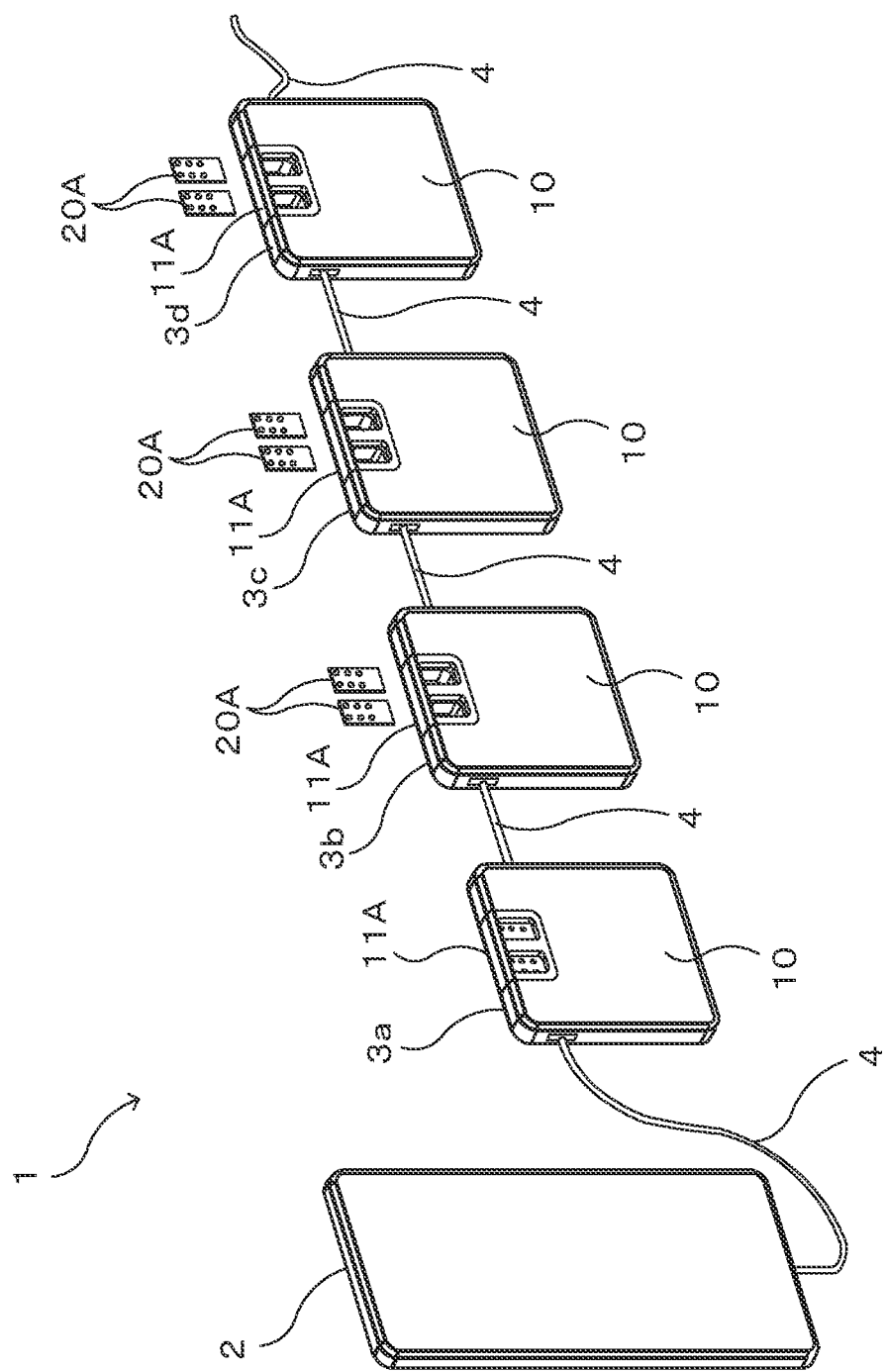
FIG. 1 is a perspective view illustrating the configuration of a detection system according to Embodiment 1 of the present disclosure.

Embodiments of the present disclosure will be described in detail below with reference to the drawings. In each drawing, the same or similar portions are denoted by the same reference characters.

Embodiment 1

First, Embodiment 1 of the present disclosure will be described. A detection system according to the present embodiment is characterized in that several kinds of substances can be collectively detected.

The detection system 1 according to the present embodiment includes an information terminal 2 and a plurality of detection instruments 3a, 3b, 3c, 3d . . . , as illustrated in FIG. 1. The number of the detection instruments 3a, 3b, 3c, 3d . . . is not particularly limited. The number of the detection instruments 3a, 3b, 3c, 3d . . . , connected to the information terminal 2, can be increased or decreased. Combinations of substances, detected by the detection instruments 3a, 3b, 3c, 3d . . . , are different from each other, as described later. In such a manner, the number of the kinds of the detected substances can be increased in comparison with the case of one detection instrument.

Figure 2:
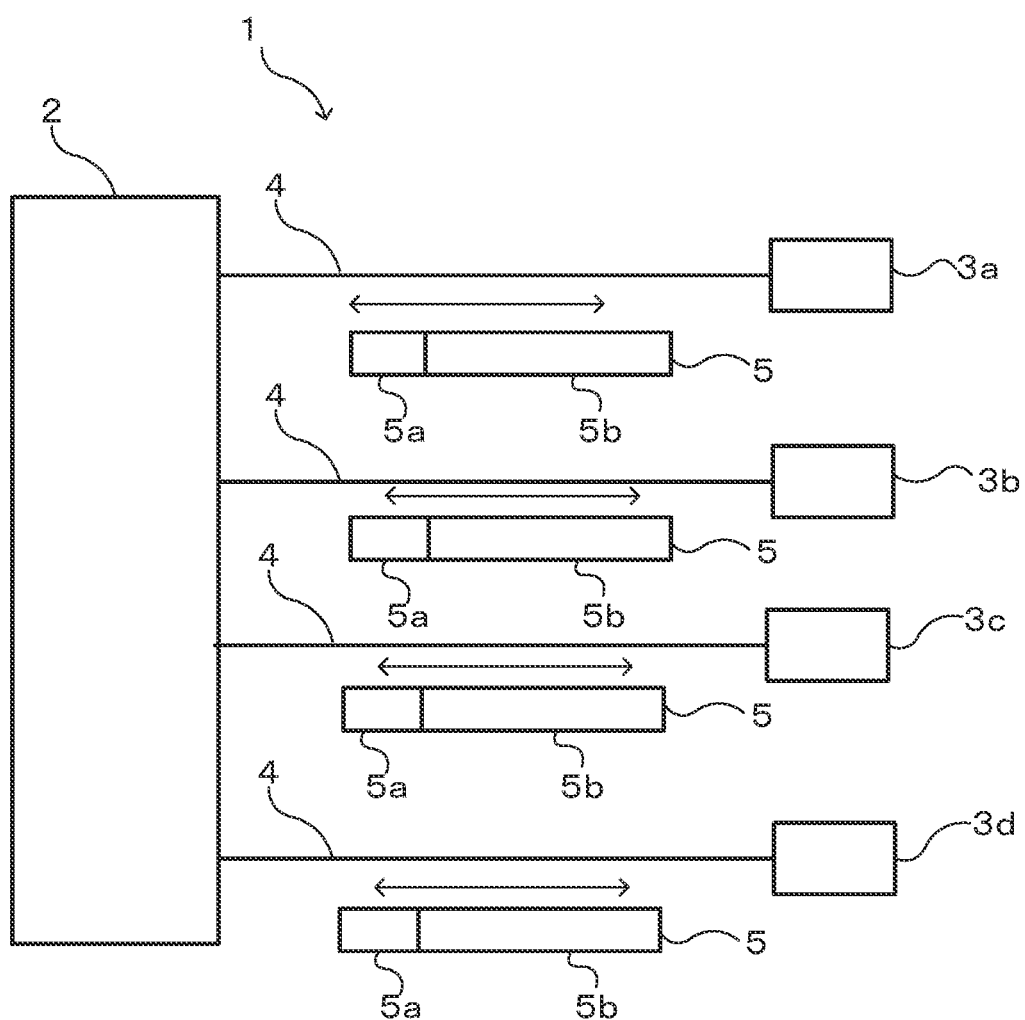
FIG. 2 is a block diagram illustrating the situation of data communication performed in the detection system in FIG. 1.

The information terminal 2 and the plurality of detection instruments 3a, 3b, 3c, 3d . . . are connected through a serial communication network 4. Through the serial communication network 4, the information terminal 2 and the plurality of detection instruments 3a, 3b, 3c, 3d . . . are connected serially. Actually, however, desired data communication can be performed between the information terminal 2 and each of the plurality of detection instruments 3a, 3b, 3c, 3d . . . , in a one-on-one or bucket-brigade manner, as illustrated in FIG. 2.

A datum 5 transmitted through the serial communication network 4 includes a header 5a and a data body 5b. The header 5a includes the identification numbers of the source and destination of the datum 5. The identification numbers enable a receiver of the datum 5 to specify that the destination of the datum 5 is the receiver, and to specify the source of the datum 5. For example, the header 5a of datum 5 transmitted from the detection instrument 3a to the information terminal 2 includes the identification number of the detection instrument 3a as a source and the identification number of the information terminal 2 as a destination. As a result, the information terminal 2 can identify that the datum 5 is transmitted from the detection instrument 3a to the information terminal 2. As a result, desired data communication between the detection instrument 3a and the information terminal 2 in a one-on-one or bucket-brigade manner can be achieved. The same applies to the detection instruments 3b, 3c, 3d . . . . The data body 5b includes the specific content of the transmitted datum.

Figure 3:
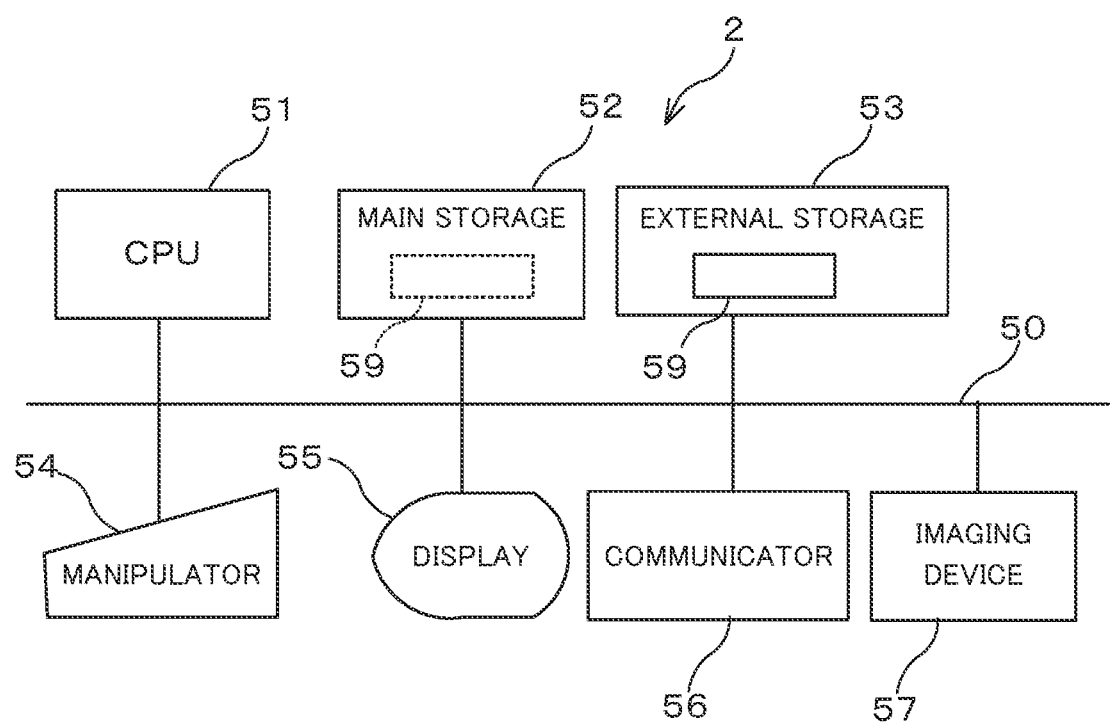
FIG. 3 is a block diagram illustrating the hardware configuration of an information terminal included in the detection system in FIG. 1.

The information terminal 2 is, for example, a smartphone or a personal computer. As illustrated in FIG. 3, the information terminal 2 includes a central processing unit (CPU) 51, a main storage 52, an external storage 53, a manipulator 54, a display 55, a communicator 56, an imaging device 57, and an internal bus 50. The CPU 51, the main storage 52, the external storage 53, the manipulator 54, the display 55, the communicator 56, and the imaging device 57 are connected through the internal bus 50.

A program 59 stored in the external storage 53 is read by the main storage 52. The CPU 51 executes the program 59 read by the main storage 52 in response to input manipulated by the manipulator 54 which is a man-machine interface. As a result, various computations, display output on the display 55, or data communication using the communicator 56 which is a communication interface for the serial communication network 4 are carried out as needed. As a result, the function of the information terminal 2 is implemented. In the present embodiment, the information terminal 2 corresponds to a substance detector that specifies a substance.

Figure 4:
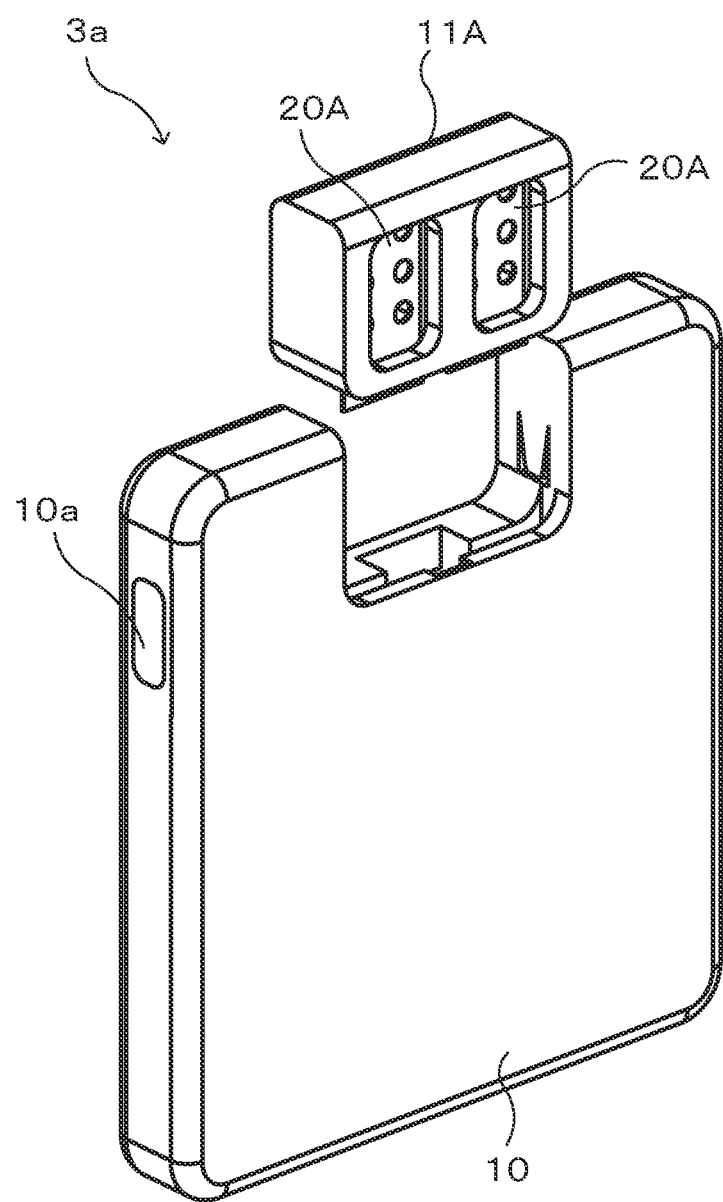
FIG. 4 is a perspective view illustrating the configuration of the detection instrument included in the detection system in FIG. 1.

As illustrated in FIG. 4, each of the plurality of detection instruments 3a includes a detection instrument body 10 and an adaptor 11A. Each of the detection instruments 3b, 3c, 3d . . . also includes a configuration similar to the configuration of the detection instrument 3a. The detection instrument body 10 includes an interface 10a for the serial communication network 4, and performs data communication with the information terminal 2. The adaptor 11A can be separated from the detection instrument body 10. The adaptor 11A exchangeably houses two cartridges (detection substrates) 20A, which are in the state of being separated from the detection instrument body 10. The adaptor 11A is inserted into the detection instrument body 10 in a state in which the cartridges 20A are attached to the adaptor 11A.

When the adaptor 11A is inserted into the detection instrument body 10, the cartridges 20A and the detection instrument body 10 are electrically connected to each other. The adaptor 11A is exchangeably attached to the detection instrument body 10.

In the present embodiment, two cartridges 20A can be attached per detection instrument. However, the number of cartridges 20A which can be attached per detection instrument may be one, or may be three or more.

Figure 5:
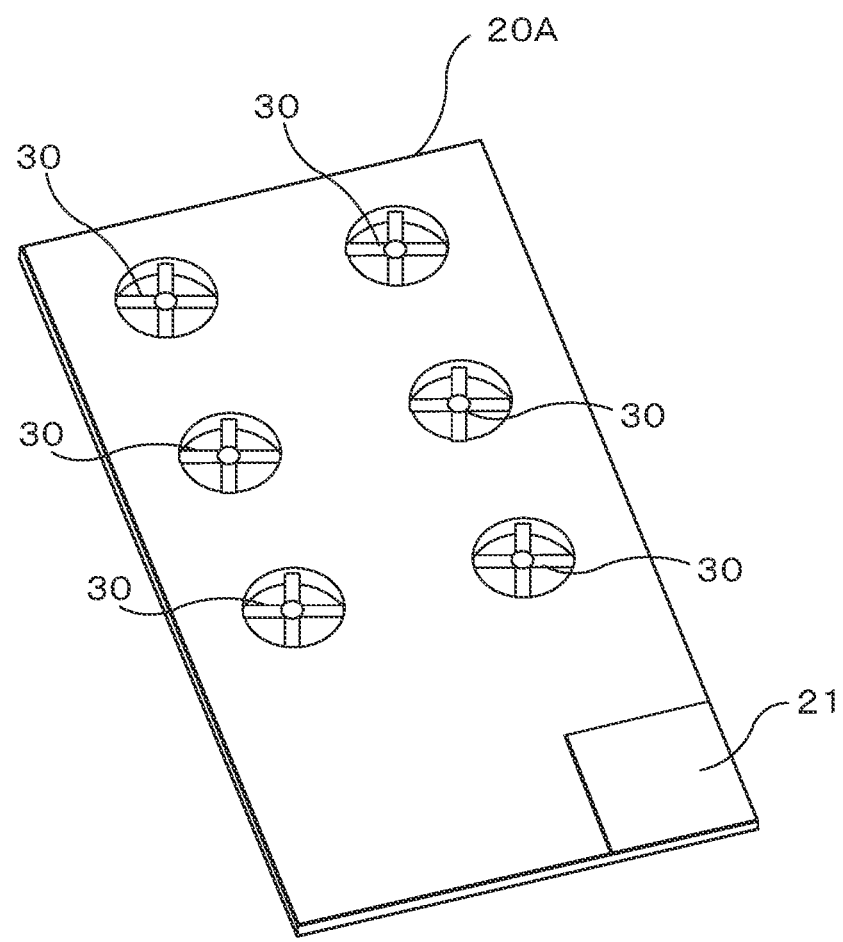
FIG. 5 is a perspective view illustrating the configuration of a cartridge included in the detection system in FIG. 1.

As illustrated in FIG. 5, six sensor devices 30 that detect a substance are disposed in each cartridge 20A. The number of sensor devices 30 in each cartridge 20A may be one to five, or may be seven or more.

Figure 6:
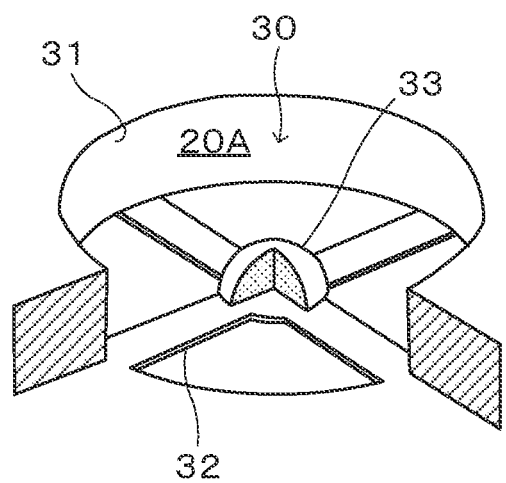
FIG. 6 is a perspective view illustrating the configuration 1 of a sensor device.
Figure 7:
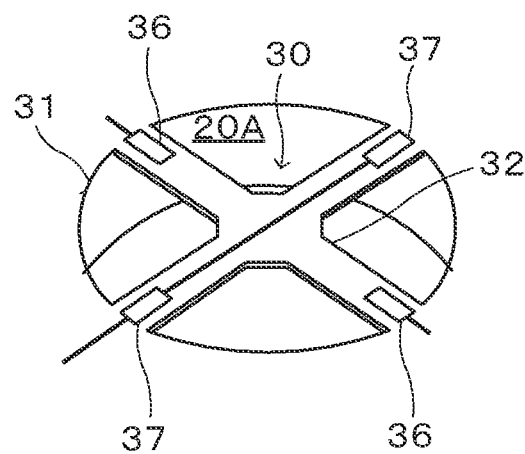
FIG. 7 is a perspective view illustrating the configuration 2 of the sensor device.

Each sensor device 30 is disposed in a through-hole 31, as illustrated in FIG. 6 and FIG. 7. The sensor device 30 includes a cross-shaped beam 32 suspended across the through-hole 31, and a sensitive membrane 33 attached to the beam 32. The beam 32 includes a piezoelectric element layer. As illustrated in FIG. 7, drive electrodes 36 and detection electrodes 37 are disposed on the ends of the beam 32. A voltage signal (driving signal) applied to the drive electrodes 36 allows the piezoelectric element layer to be stretched and shrunk to vibrate the beam 32, and a voltage signal (detection signal) generated in the piezoelectric element layer by the vibration is detected through the detection electrodes 37.

The drive electrodes 36 and the detection electrodes 37 are connected to the detection instrument body 10, and the application of the voltage signal (driving signal) to the drive electrodes 36 and the detection of the voltage signal (detection signal) through the detection electrodes 37 are performed by the detection instrument body 10 to which the cartridges 20A are attached. The detection instrument body 10 outputs the driving signal to the drive electrodes 36, and inputs the detection signal from the detection electrodes 37. The detection signal is a detection signal for a substance corresponding to each sensitive membrane 33, output from each cartridge 20A. The detection instrument body 10 calculates the resonance frequency of the beam 32, on the basis of the input detection signal, to calculate a variation in the resonance frequency of the beam 32.

Figure 8:
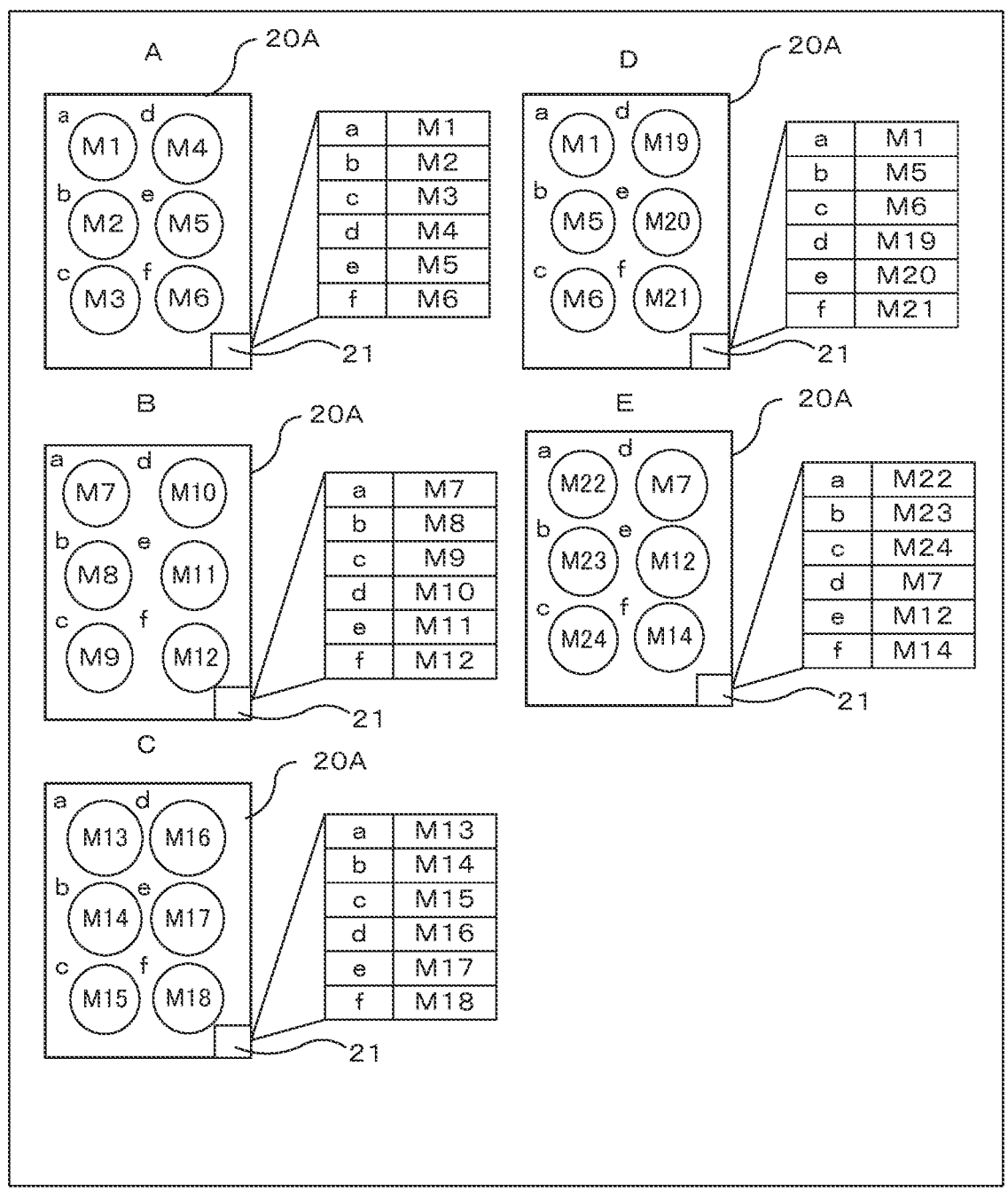
FIG. 8 is a view illustrating an example of a plurality of cartridges that detects substances of which combinations are different from each other.

In the present embodiment, the several kinds of the cartridges 20A detecting substances of which combinations are different from each other are prepared. FIG. 8 illustrates five cartridges 20A, denoted by reference characters A to E. Places in which sensor devices 30 are arranged in each cartridge 20A are assigned with reference characters a to f, respectively.

In the cartridge 20A denoted by reference character A, membranes M1 to M6 are attached as the sensitive membranes 33 to the places a to f in which the sensor devices 30 are arranged. Likewise, the sensitive membranes 33 arranged in arrangement places a to f in the cartridge 20A denoted by reference characters B are membranes M7 to M12, respectively. Moreover, the sensitive membranes 33 arranged in arrangement places a to f in the cartridge 20A denoted by reference character C are membranes M13 to M18. Moreover, the sensitive membranes 33 arranged in arrangement places a to f in the cartridge 20A denoted by reference character D are membranes M1, M5, M6, and M19 to M21. Moreover, the sensitive membranes 33 arranged in arrangement places a to f in the cartridge 20A denoted by reference character E are membranes M22 to M24, M7, M12, and M14. Substances to which the membranes M1 to M24 are sensitive are different from each other. Moreover, the number of the kinds of the membranes is not limited to 24. Actually, sensitive membranes 33 of which the number of the kinds is more than 100 can be prepared.

Figure 9:
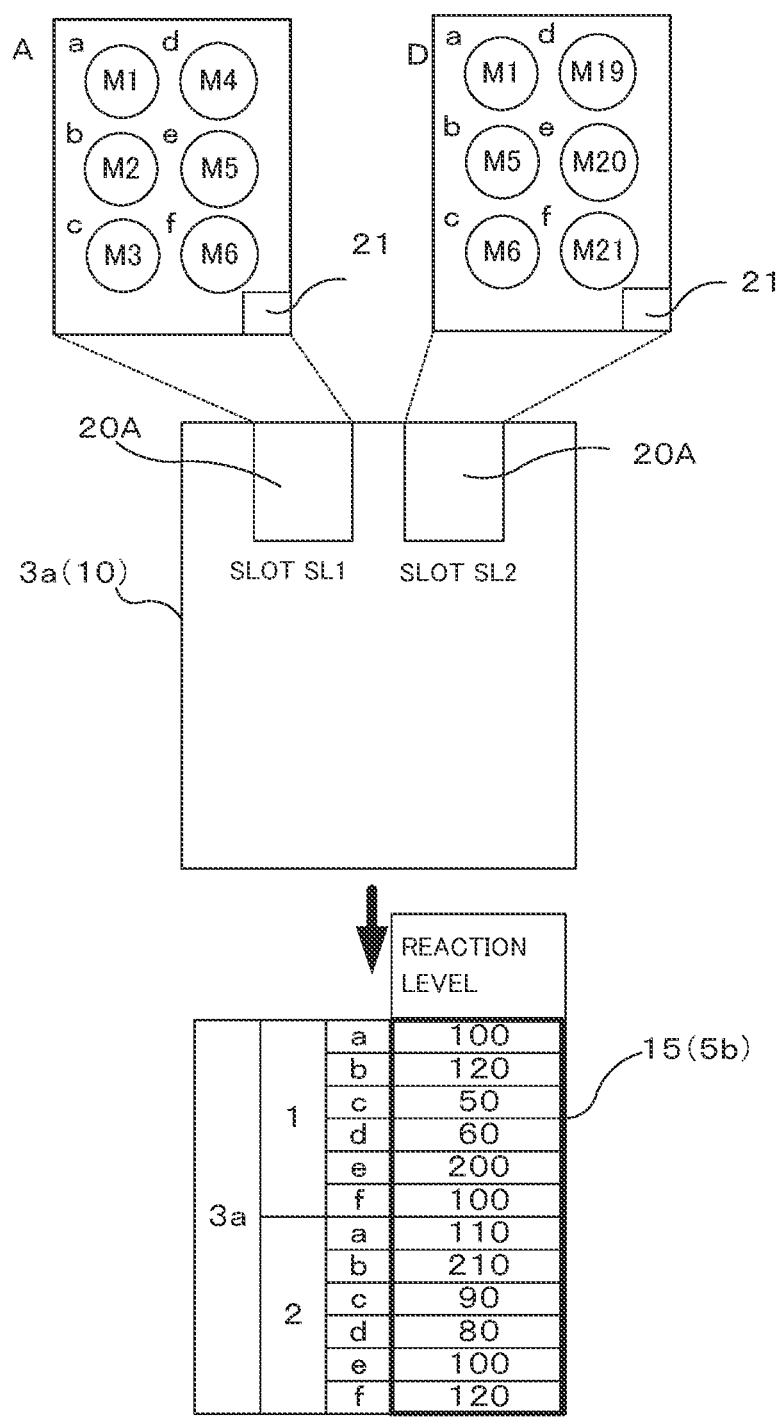
FIG. 9 is a schematic view illustrating first data representing the results of detection by a sensor device.

As illustrated in FIG. 9, the detection instrument body 10 includes two slots SL1 and SL2, to which the two cartridges 20A are exchangeably attached. Voltage signals (detection signals) output from the cartridges 20A attached to the slots SL1 and SL2 are input into the detection instrument body 10, and the detection instrument body 10 calculates variations in the resonance frequencies of the sensor devices 30 on the basis of the input detection signals, and generates the calculated variations as the data (first data 15) of reaction levels representing the results of the detection of substances corresponding to the sensitive membranes 33. Each of the units of the reaction levels is, for example, Hz.

For example, in a case in which the cartridge 20A denoted by reference character A is attached to the slot SL1, and the cartridge 20A denoted by reference character D is attached to the slot SL2, in the detection instrument body 10 of the detection instrument 3a, the detection instrument 3a transmits, to the information terminal 2, the datum 5 in which the first data 15 representing the reaction levels of the membranes M1 to M6, M1, M5, M6, M19, M20, and M21 in the arrangement places a to f of the slots SL1 and SL2 is inserted into the data body 5b. In this case, the first data 15 represented by the data body 5b is (100, 120, 50, 60, 200, 100, 110, 210, 90, 80, 100, 120).

Additional examples of combinations of two cartridges 20A include (A, B), (A, C), (A, E), (B, C), (B, D), (B, E), (C, D), (C, E), and (D, E). Likewise, each of the detection instruments 3b, 3c, 3d . . . also transmits, as first data 15, the detection results of substances corresponding to the sensitive membranes 33, that is, the reaction levels of the sensitive membranes 33, detected in the cartridges 20A attached to the slots SL1 and SL2, to the information terminal 2 The information terminal 2 can recognize a detection instrument that has transmitted the first data 15, on the basis of the identification number of the source in the header 5a of the datum 5.

Further, each cartridge 20A includes an IC memory 21 as a memory, as illustrated in FIG. 5. As illustrated in FIG. 8, the IC memory 21 stores data in which the results of the detection of the substances corresponding to the sensitive membranes 33 of the sensor devices 30 are associated with the membrane information of the sensitive membranes 33. In such a case, the membrane information is information for identifying the substances that are sensitive to (adsorbed by) the sensitive membranes 33, such as the kinds of the sensitive membranes 33.

The IC memory 21 of the cartridge 20A denoted by reference character A stores that the sensitive membranes 33 arranged in the arrangement places a to f are the membranes M1 to M6. Likewise, the IC memory 21 of the cartridge 20A denoted by reference character B stores that the sensitive membranes 33 arranged in the arrangement places a to f are the membranes M7 to M12, respectively. Moreover, the IC memory 21 of the cartridge 20A denoted by reference character C stores that the sensitive membranes 33 arranged in the arrangement places a to f are the membranes M13 to M18. Further, the IC memory 21 of the cartridge 20A denoted by reference character D stores that the sensitive membranes 33 arranged in the arrangement places a to f are the membranes M1, M5, M6, and M19 to M21. The IC memory 21 of the cartridge 20A denoted by reference character E stores that the sensitive membranes 33 arranged in the arrangement places a to f are the membranes M22, M23, M24, M7, M12, and M14.

Figure 10:
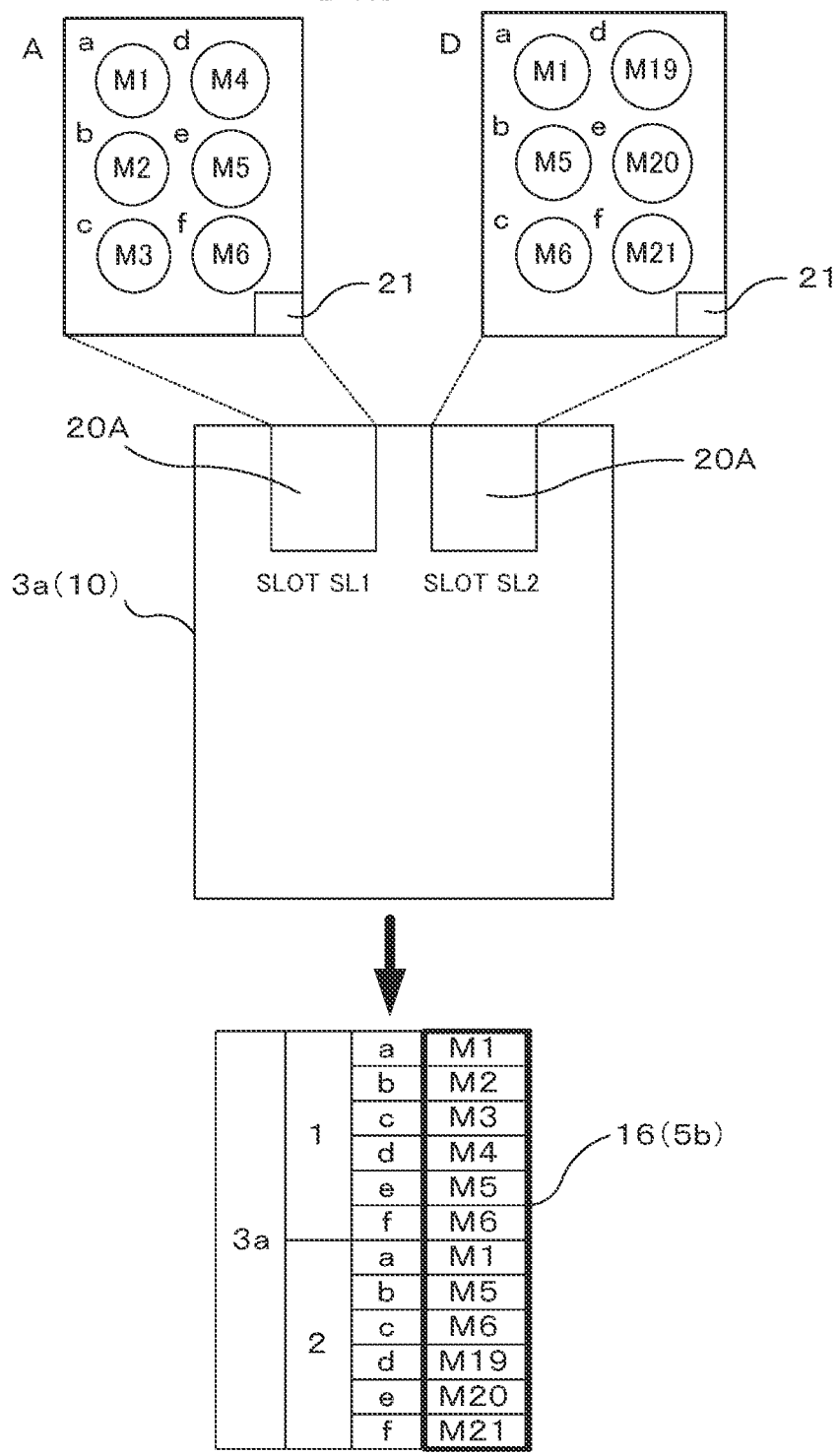
FIG. 10 is a schematic view illustrating second data in which the results of the detection by the sensor device are associated with the kinds of detected substances.

As illustrated in FIG. 10, the detection instrument body 10 reads second data 16, in which the results of the detection of the substances corresponding to the sensitive membranes 33 are associated with the membrane information of the sensitive membranes 33, from the IC memories 21 of the cartridges 20A set in the attached adaptor 11A. The detection instrument body 10 transmits a datum 5 including the read second data 16 as a data body 5b to the information terminal 2 through the serial communication network 4.

For example, a case, in which the cartridge 20A denoted by reference character A is attached to the slot SL1, and the cartridge 20A denoted by reference character D is attached to the slot SL2, in the adaptor 11A of the detection instrument 3a, is considered. In this case, the detection instrument body 10 of the detection instrument 3a reads second data 16 representing that the sensitive membranes 33 in the arrangement places a to f of the slot SL1 are the membranes M1 to M6, and the sensitive membranes 33 in the arrangement places a to f of the slot SL2 are the membranes M1, M5, M6, M19, M20, and M21. The detection instrument 3a transmits a datum 5 including the second data 16 as a data body 5b to the information terminal 2 through the serial communication network 4. In this case, the second data 16 as the data body 5b is (M1, M2, M3, M4, M5, M6, M1, M5, M6, M19, M20, and M21). Likewise, each of the detection instruments 3b, 3c, 3d . . . transmits a datum 5 including, as a data body 5b, second data 16 corresponding to an attached cartridge 20A to the information terminal 2 through the serial communication network 4. The information terminal 2 can recognize a detection instrument that has transmitted the second data 16 on the basis of the identification number of the source in the header 5a of the datum 5.

As described above, each of the plurality of detection instruments 3a, 3b, 3c, 3d . . . includes the one or more sensitive membranes 33 sensitive to substances, generates the first data 15 representing the results of detection of the substances corresponding to the sensitive membranes 33, and includes the second data 16 in which the results of the detection of the substances corresponding to the sensitive membranes 33 are associated with the membrane information of the sensitive membranes 33.

More specifically, in each of the plurality of detection instruments 3a, 3b, 3c, 3d . . . , the adaptor 11A includes the two cartridges 20A provided with the sensitive membranes 33, outputs detection signals for the substances corresponding to the sensitive membranes 33, output from the cartridges 20A, and includes the second data 16. The detection instrument body 10 generates the first data 15 on the basis of the detection signals for the substances corresponding to the sensitive membranes 33, output from the attached adaptor 11A. The detection instrument body 10 transmits the first data 15 to the information terminal 2 through the serial communication network 4.

Further, each of the cartridges 20A of the adaptor 11A includes the IC memory 21 storing the second data 16. The detection instrument body 10 reads the second data 16 from the IC memory 21 of each of the attached cartridges 20A, and transmits the second data 16 to the information terminal 2 through the serial communication network 4.

The information terminal (substance detector) 2 collects the first data 15 transmitted from each of the plurality of detection instruments 3a, 3b, 3c, 3d . . . , and the second data 16 read by each of the plurality of detection instruments 3a, 3b, 3c, 3d . . . , through the serial communication network 4. The information terminal 2 compares the collected first data 15 and second data 16 to specify a substance. For example, the information terminal 2 compares the first data 15 and the second data 16 for the detection instrument 3a, as illustrated in FIG. 11. As a result of the comparison, the information terminal 2 generates reaction level data 17 in which the membranes M1 to M6, and the membranes M1, M5, M6, M19, M20, and M21 are associated with the reaction levels of the respective membranes, and which represents the reaction levels of the membranes. As a result, the information terminal 2 can specify the detected substance. The information terminal 2 performs similar processing for the detection instruments 3b, 3c, 3d . . . , to generate reaction level data 17 in each of the detection instruments.

Figure 12:
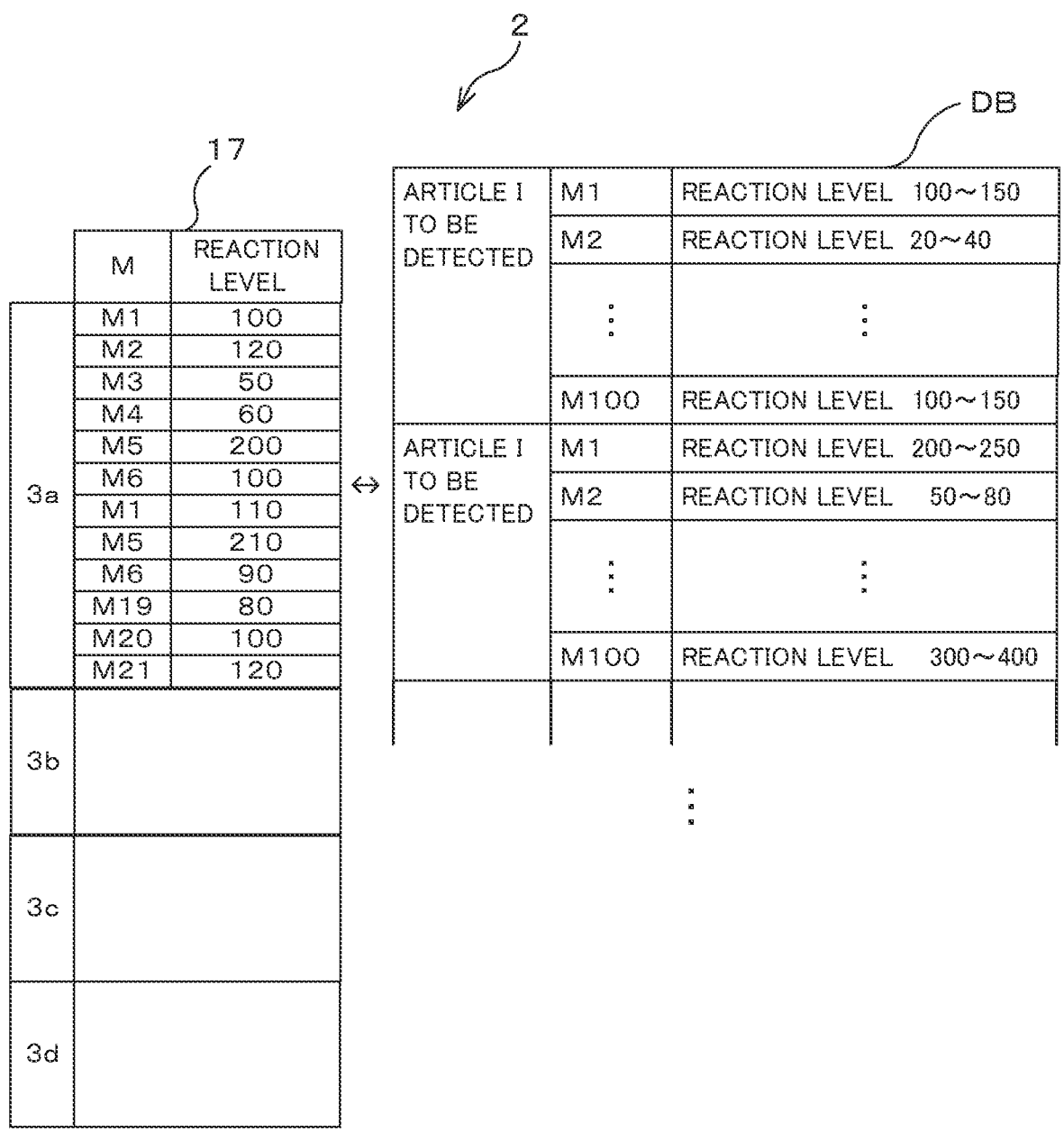
FIG. 12 is a schematic view illustrating an example of processing of a database.

Further, the information terminal 2 includes a database DB in which data groups in which the specified substances (sensitive membranes), the reaction levels, and objects to be detected, including the specified substances, are associated with each other are accumulated, as illustrated in FIG. 12. In the database DB, articles to be detected I, II . . . , which are objects to be detected, and the ranges of the reaction levels of the membranes M1, M2, M3 . . . in the articles I, II . . . to be detected are associated with each other, and registered. The information terminal 2 refers to the database DB with the reaction level data 17 of each of the detection instruments 3a, 3b, 3c, 3d . . . as a key, and detects an object to be detected. For example, in a case in which the reaction levels of the membranes M1, M2, M3 . . . fall within the ranges of the reaction levels corresponding to the article I to be detected, the article I to be detected is specified as a detection substance. The database DB is actually formed by using the detection system 1 to perform measurement of the known articles I, II . . . to be detected, and registering and accumulating the detected reaction levels.

Figure 13:
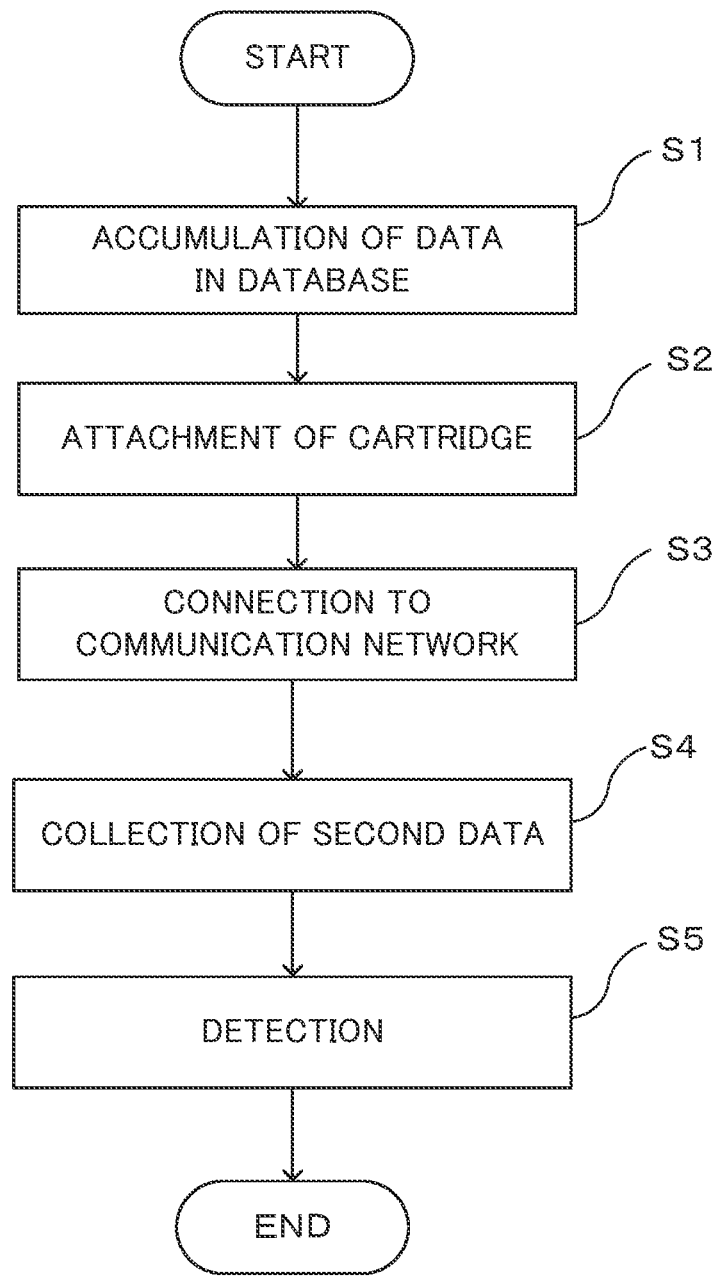
FIG. 13 is a flow chart illustrating the flow of measurement of the detection system according to Embodiment 1 of the present disclosure.

The flow of measurement of an object to be detected using the detection system 1 according to the present embodiment will now be described. First, the detection system 1 accumulates data in the database DB (step S1), as illustrated in FIG. 13. Specifically, the detection system 1 uses the plurality of detection instruments 3a, 3b, 3c, 3d . . . to detect substances in the known objects to be detected (articles I, II . . . to be detected). The information terminal 2 compares the first data 15 and second data 16 collected in advance, to generate the reaction level data 17 of each of the plurality of detection instruments 3a, 3b, 3c, 3d . . . . Further, the information terminal 2 accumulates, in the database DB, the data groups of the reaction level data 17 of each of the plurality of detection instruments 3a, 3b, 3c, 3d . . . and the known objects to be detected. As a result, for example, the database DB illustrated in FIG. 12 is generated.

Subsequently, the cartridges 20A are attached to the detection instruments 3a, 3b, 3c, 3d . . . (step S2). In this case, the cartridges 20A including the sensitive membranes 33 sensitive to substances included in the objects to be detected are selected.

Subsequently, the information terminal 2 and the detection instruments 3a, 3b, 3c, 3d . . . are connected through the serial communication network 4 (step S3). As a result, the detection system 1 illustrated in FIG. 1 is constructed.

Subsequently, the detection system 1 collects the second data 16 (step S4). Specifically, each of the plurality of detection instruments 3a, 3b, 3c, 3d . . . reads the second data 16 from the IC memories 21 of the cartridges 20A attached to the adaptor 11A. The information terminal 2 collects the second data 16, read by each of the plurality of detection instruments 3a, 3b, 3c, 3d . . . , through the serial communication network 4.

Subsequently, the detection system 1 detects a substance (step S5). Specifically, the plurality of detection instruments 3a, 3b, 3c, 3d . . . detects a substance in an unknown object to be detected. The information terminal 2 collects the first data 15 representing the detection results thereof through the serial communication network 4. The information terminal 2 compares the collected first data 15 and the second data 16 obtained in step S4 to generate the reaction level data 17 of the plurality of detection instruments 3a, 3b, 3c, 3d . . . . Further, the information terminal 2 refers to the database DB with the generated reaction level data 17 as a key, and detects an object to be detected from the articles I, II . . . to be detected.

In the present embodiment, the information terminal 2 collects the second data 16, and then collects the first data 15. However, the first data 15 and the second data 16 may be collected simultaneously.

Embodiment 2

Embodiment 2 of the present disclosure will now be described. In a detection system 1 according to the present embodiment, a configuration and operation for generating second data are different from the configuration and operation of Embodiment 1 described above.

Figure 14:
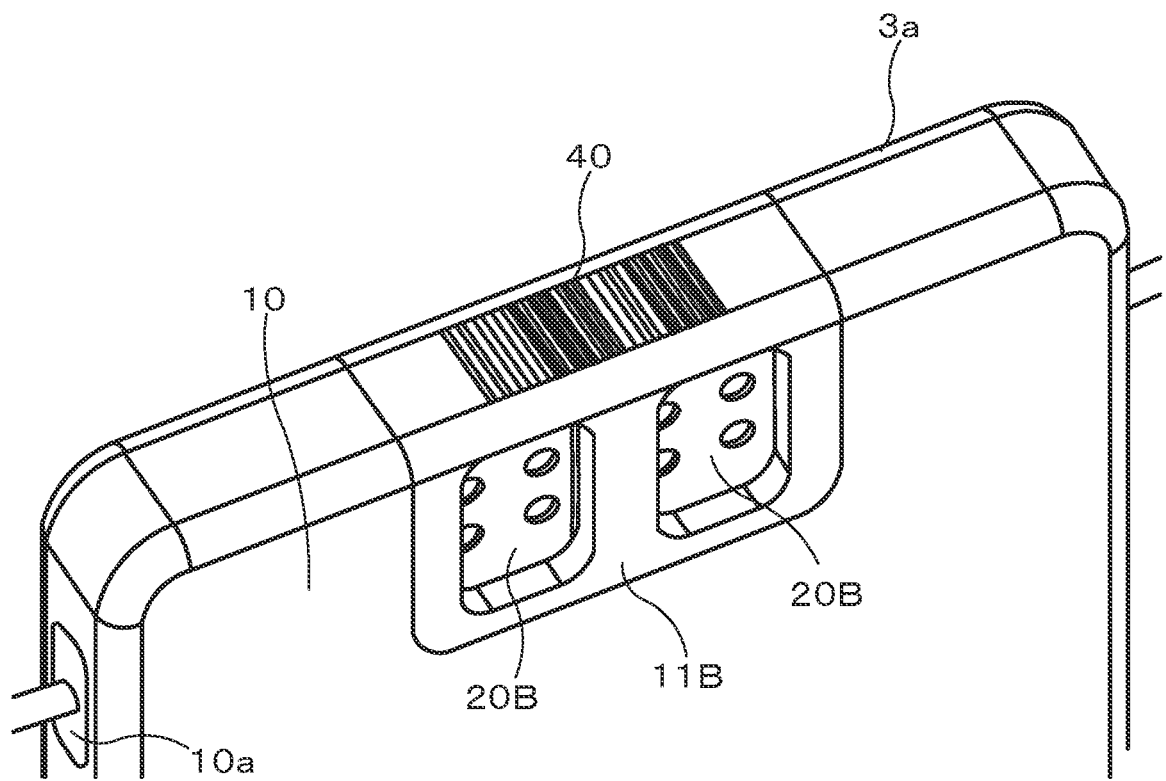
FIG. 14 is a perspective view illustrating a part of a cartridge included in a detection system according to Embodiment 2 of the present disclosure.

In addition, in the present embodiment, cartridges 20B are used instead of the cartridges 20A, as illustrated in FIG. 14. The cartridges 20B differ from the cartridges 20A in that each cartridge 20B is not provided with the IC memory 21.

A bar code 40 corresponding to the attached cartridges 20B is displayed on the adaptor 11B of each of a plurality of detection instruments 3a, 3b, 3c, 3d . . . . The bar code 40 is an identification code representing second data 16 in which the results of detection of substances corresponding to sensitive membranes 33 in the cartridges 20B are associated with the membrane information of the sensitive membranes 33. In a case in which the cartridges 20B attached to the adaptor 11B are exchanged for other cartridges, the bar code 40 is also changed.

Figure 15:
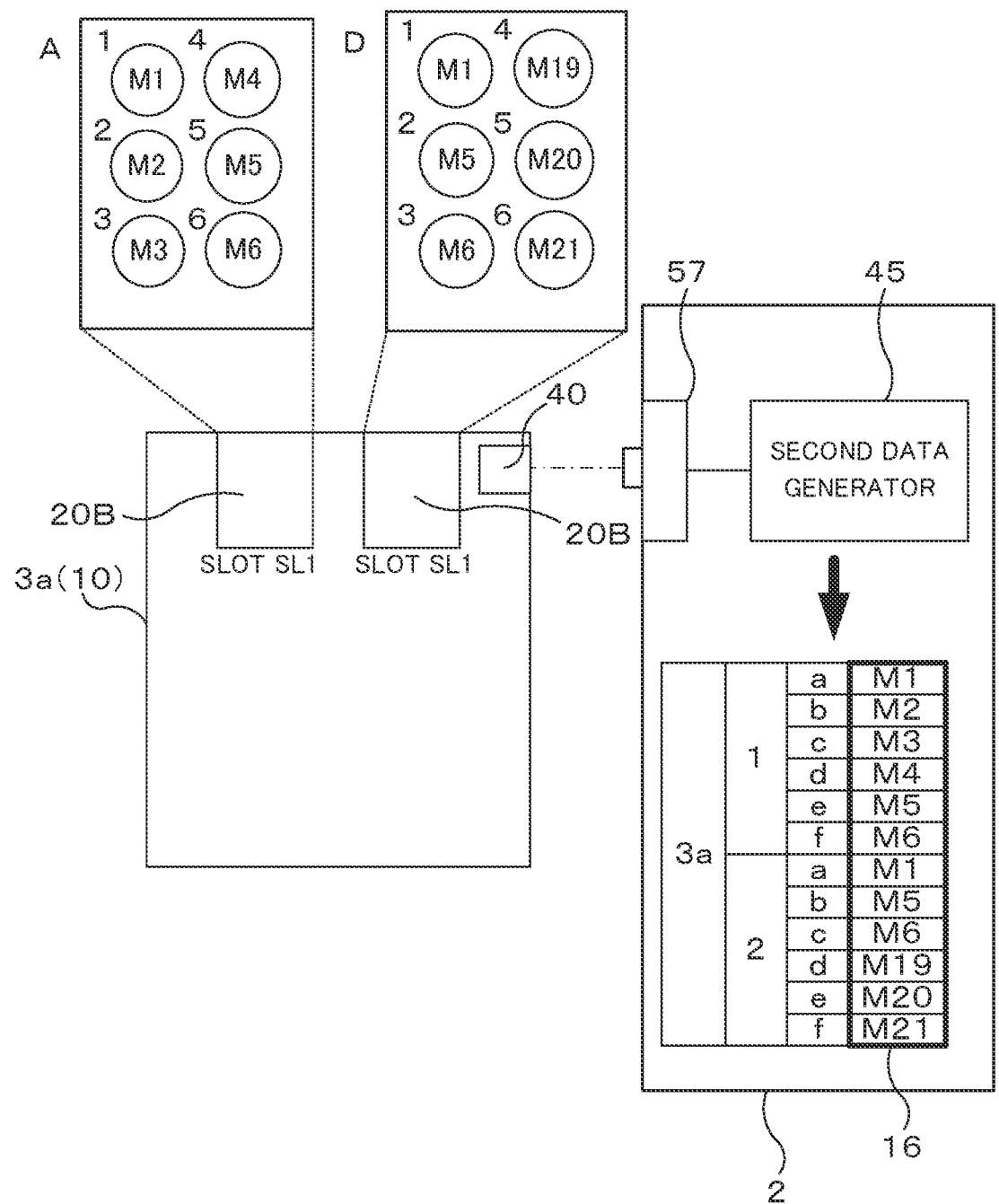
FIG. 15 is a schematic view illustrating data flow in the detection system according to Embodiment 2 of the present disclosure.

As illustrated in FIG. 15, the information terminal 2 includes an imaging device 57 that images the bar code 40 displayed on the adaptor 11B of each of the plurality of the detection instruments 3a, 3b, 3c, 3d . . . . Further, the information terminal 2 includes a second data generator 45 that decodes the bar code 40 imaged by the imaging device 57, to generate the second data 16. When the bar code 40 is imaged in each of the plurality of detection instruments 3a, 3b, 3c, 3d . . . , the identification number of the corresponding detection instrument 3a is specified and input by input manipulated by a manipulator 54 (see FIG. 3), and is associated with the second data 16.

Like Embodiment 1 as described above, the information terminal 2 collects first data 15 from each of the plurality of detection instruments 3a, 3b, 3c, 3d . . . , and collects the second data 16 by imaging and decoding the bar code 40 of each of the plurality of detection instruments 3a, 3b, 3c, 3d . . . in the second data generator 45. Further, the information terminal 2 specifies a substance by comparing the collected first data 15 and second data 16 to generate reaction level data 17. Like Embodiment 1 as described above, the information terminal 2 refers to a database DB with the reaction level data 17 as a key, and detects an object to be detected.

The bar code 40 is a one-dimensional bar code in the present embodiment; however, the present disclosure is not limited thereto. A two-dimensional bar code may be used as the bar code 40.

In accordance with each of the embodiments described above, the information terminal 2 compares the first data 15 representing the results of the detection of the substances corresponding to the sensitive membranes 33 included in each of the plurality of detection instruments 3a, 3b, 3c, 3d . . . , and the second data 16 in which the results of the detection of the substances corresponding to the sensitive membranes 33 included in each of the plurality of detection instruments 3a, 3b, 3c, 3d . . . are associated with the membrane information of the sensitive membranes 33, to specify a substance, as described in detail above. As a result, the detection results in the sensitive membranes 33 and the membrane information of the sensitive membranes 33 can be automatically linked to each other. As a result, a user is eliminated having to perform an operation of taking control of the sensitive membranes 33, and the number of collectively detected substances can be increased regardless of the number of detection instruments.

In accordance with the detection system 1 according to each of the embodiments described above, only an increase in the number of disposed detection instruments of which the types are the same, or only an exchange of the adaptor 11A or 11B of each detection instrument enables functions to be expanded so that an object to be detected, other than a specific object to be detected, can also be detected. In other words, the detection system 1 can be generalized Moreover, such objects to be detected include objects containing components similar to each other. Use of the detection system 1 according to each of the embodiments described above enables the number of the kinds of detectable substances to be increased to enhance the possibility of distinguish objects to be detected, containing components similar to each other, from each other. As a result, the accuracy of detecting an object to be detected can be improved.

In contrast, the number of detection instruments can be decreased in a case in which the number of substances to be detected is small. In such a manner, the detection system 1 can be allowed to have the minimum configuration, and to gain superiority in miniaturization, usability, and a cost.

In accordance with Embodiment 1 as described above, the cartridges 20A are provided with the IC memories 21 that store the second data 16, each of the plurality of detection instruments 3a, 3b, 3c, 3d . . . reads the second data 16 from the IC memory 21 of the attached cartridge 20A, and the information terminal 2 receives the second data 16, read by each of the plurality of detection instruments 3a, 3b, 3c, 3d . . . , through the serial communication network 4. In such a manner, the detection results in the sensitive membranes 33 and the membrane information of the sensitive membranes 33 can be automatically associated with each other, and therefore, the number of the disposed detection instruments 3a, 3b, 3c, 3d . . . can be easily increased.

In accordance with Embodiment 2 as described above, the bar code 40 representing the second data 16 is displayed on the adaptor 11B. The information terminal 2 includes the imaging device 57 that images the bar code 40 displayed on each of the detection instruments 3a, 3b, 3c, 3d . . . , and generates the second data 16 on the basis of the bar code 40 imaged by the imaging device 57. In such a manner, the results of the detection of the substances corresponding to the sensitive membranes 33 can be automatically associated with the membrane information of the sensitive membrane 33, and therefore, the number of the disposed detection instruments 3a, 3b, 3c, 3d . . . can also be easily increased.

In accordance with each of the embodiments described above, the information terminal 2 includes the database DB in which data groups in which specified substances and objects to be detected, containing the specified substances as components, are associated with each other are accumulated.

The information terminal 2 refers to the database DB, and detects objects to be detected (articles I, II . . . to be detected). The database DB is generated based on actual detection results, and has variations to some extent. Even in a case in which the variations cause errors in the detection results, the objects to be detected can be detected precisely. As a result, the accuracy of the detection of the objects to be detected can be improved.

The shape of the beam 32 in the sensor device 30 is a cross shape in each of the embodiments described above; however, the present disclosure is not limited thereto. The shape of the beam 32 is not particularly limited. The sensor device 30 includes the beam 32 provided with the sensitive membrane 33 in each of the embodiments described above; however, the present disclosure is not limited thereto. Any sensor device can be used as long as being a sensor that can detect a substance using the sensitive membrane 33. Moreover, the sensor device can be used as a sensor that detects not only the presence or absence of a substance but also the concentration of the substance.

The detection system 1 according to each of the embodiments described above may be used as an odor sensor or olfactory sensor that detects an odor, or may be used as a gustatory sensor that detects the taste of a substance. Moreover, such an object to be detected may be gas or liquid.

The information terminal 2 is a smartphone in each of the embodiments described above; however, the present disclosure is not limited thereto. The information terminal 2 may be a personal computer or a tablet computer.

Data communication is performed through the serial communication network 4 in the present embodiment; however, the present disclosure is not limited thereto. For example, the data communication may be performed through a star network. Moreover, the data communication is performed through the wired network in the present embodiment; however, the present disclosure is not limited thereto. The data communication may be performed through a wireless network. As the wireless network, Wi-Fi (registered trademark) may be used, or short-haul communications such as Bluetooth (registered trademark) may be used.

Moreover, the combinations of the detected substances in the plurality of detection instruments 3a, 3b, 3c, 3d . . . are different from each other in each of the embodiments described above; however, the present disclosure is not limited thereto. All the detected substances in the detection instruments 3a, 3b, 3c, 3d . . . may be identical. In this case, it is also possible to distributively arrange the detection instruments 3a, 3b, 3c, 3d . . . , to detect the distribution state of a certain substance. In this case, it is also acceptable that the plurality of detection instruments 3a, 3b, 3c, 3d . . . has the position information of the respective detection instruments, and the information terminal 2 collects the position information from the plurality of detection instruments 3a, 3b, 3c, 3d . . . .

In addition, the hardware and software configurations of the information terminal 2 are examples, and can be optionally changed and modified.

A portion that plays a key role for performing processing of the information terminal 2 including the CPU 51, the main storage 52, the external storage 53, the manipulator 54, the display 55, the communicator 56, the imaging device 57, the internal bus 50, and the like can be implemented using a usual computer system without using a dedicated system, as described above. For example, the information terminal 2 that executes the processing may be configured by distributing a computer program for executing the operation, stored in a non-transitory computer-readable recording medium (flexible disk, CD-ROM, DVD-ROM, or the like), and by installing the computer program on a computer. The information terminal 2 may be configured by allowing a usual computer system to, for example, download the computer program, stored in a storage apparatus included in a server apparatus on a communication network such as the Internet.

In a case in which, for example, the function of a computer is implemented by share in an operating system (OS) and an application program, or by the cooperation of the OS and the application program, only the application program may be stored in a non-transitory recording medium or a storage apparatus.

It is also possible to superimpose the computer program on a carrier wave, and to distribute the computer program through a communication network. For example, it is also acceptable to upload a computer program to a bulletin board (a bulletin board system (BBS)) on the communication network, and to distribute the computer program through the network. A configuration may be made so that the processing can be executed by starting the computer program and executing the computer program, in a manner similar to the manner of another application program, under the control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the priority of Japanese Patent Application No. 2019-004005, filed on Jan. 15, 2019, the entire disclosure of which is incorporated by reference herein.

INDUSTRIAL APPLICABILITY

The present disclosure can be applied to detection of a substance.

REFERENCE SIGNS LIST

1 Detection system
2 Information terminal (substance detector)
3a, 3b, 3c, 3d Detection instrument
4 Serial communication network
5 Datum
5a Header
5b Data body
10 Detection instrument body
10a Interface
11A, 11B Adaptor
15 First data
16 Second data
17 Reaction level data
20A, 20B Cartridge
21 IC memory
30 Sensor device
31 Through-hole
32 Beam
33 Sensitive membrane
36 Drive electrode 37 Detection electrode
40 Bar code
45 Second data generator
50 Internal bus
51 CPU
52 Main storage
53 External storage
54 Manipulator
55 Display
56 Communicator
57 Imaging device
59 Program
M1 to M24 Membrane
SL1, SL2 Slot
DB Database

The invention claimed is:

1. A detection system comprising:
a plurality of detection instruments, each of the plurality of detection instruments comprising a detection instrument body and at least one detection substrate that is exchangeably attached to the detection instrument body and is provided with a sensitive membrane sensitive to a substance, generating first data representing a result of detection of the substance corresponding to the sensitive membrane based on a detection signal of the substance corresponding to the sensitive membrane output from the at least one detection substrate, and comprising second data that is data representing membrane information of the sensitive membrane and associated with the result of the detection of the substance corresponding to the sensitive membrane; and
a substance detector that collects the first data and the second data from the plurality of detection instruments, and compares the first data and the second data, to specify a substance, wherein
each of the detection instruments further comprises the detection instrument body that transmits the first data to the substance detector through a communication network.

2. The detection system according to claim 1, wherein
the at least one detection substrate comprises a memory for storing the second data,
the detection instrument body reads the second data from the attached memory of the at least one detection substrate, and
the substance detector collects, through the communication network, the second data read by the detection instrument body included in each of the plurality of detection instruments.

3. The detection system according to claim 1, wherein
an identification code representing the second data is displayed on the at least one detection substrate,
the detection system comprises an imaging device that images the identification code displayed on the at least one detection substrate of each of the plurality of detection instruments, and
the substance detector collects the second data based on the identification code imaged by the imaging device.

4. The detection system according to claim 1, wherein the substance detector comprises a database including reaction level data including a range of a reaction level of the sensitive membrane to the detection of the substance corresponding to the sensitive membrane.

* * * * *